(12) United States Patent
Ewanchuk et al.

(10) Patent No.: US 7,924,284 B2
(45) Date of Patent: Apr. 12, 2011

(54) RENDERING HIGHLIGHTING STROKES

(75) Inventors: Brian J. Ewanchuk, Redmond, WA (US); Koji Kato, Bellevue, WA (US); Stefan Wick, Issaquah, WA (US); Vladimir V. Smirnov, Bothell, WA (US); Sam J. George, Duvall, WA (US); Shawn Van Ness, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 11/212,911

(22) Filed: Aug. 29, 2005

(65) Prior Publication Data
US 2006/0242349 A1    Oct. 26, 2006

Related U.S. Application Data (60) Provisional application No. 60/673,769, filed on Apr. 22, 2005.

(51) Int. Cl.
*G06T 11/20* (2006.01)
*G06T 11/00* (2006.01)
*G06F 3/033* (2006.01)
*G09G 5/02* (2006.01)
*G09G 5/00* (2006.01)
*G06K 9/00* (2006.01)

(52) U.S. Cl. ........ 345/443; 345/179; 345/589; 345/592; 345/629; 345/467; 382/162; 382/163

(58) Field of Classification Search .......... 345/179, 345/589, 592, 629, 441, 467, 443; 382/162, 382/163
See application file for complete search history.

(56) References Cited

U.S. PATENT DOCUMENTS

| | | | |
|---|---|---|---|
| 5,887,125 A * | 3/1999 | Takano et al. | 358/1.12 |
| 6,041,335 A * | 3/2000 | Merritt et al. | 715/203 |
| 6,268,865 B1 * | 7/2001 | Daniels et al. | 345/582 |
| 6,329,990 B1 * | 12/2001 | Silverbrook et al. | 345/589 |
| 6,373,490 B1 * | 4/2002 | Bendiksen et al. | 345/441 |
| 7,102,651 B1 * | 9/2006 | Louveaux et al. | 345/629 |
| 7,164,499 B1 * | 1/2007 | Gupta | 358/1.9 |
| 2003/0025675 A1 * | 2/2003 | Dresevic et al. | 345/173 |
| 2004/0085358 A1 * | 5/2004 | Tolmer et al. | 345/767 |
| 2005/0044106 A1 * | 2/2005 | Duncan et al. | 707/104.1 |
| 2005/0097453 A1 * | 5/2005 | Simonyi | 715/513 |
| 2005/0099398 A1 * | 5/2005 | Garside et al. | 345/173 |
| 2005/0120239 A1 * | 6/2005 | Monroe et al. | 713/201 |
| 2006/0103671 A1 * | 5/2006 | Brown | 345/629 |
| 2006/0103859 A1 * | 5/2006 | Duncan et al. | 358/1.8 |
| 2006/0109499 A1 * | 5/2006 | Klassen et al. | 358/1.15 |

* cited by examiner

*Primary Examiner* — Xiao M Wu
*Assistant Examiner* — David T Welch
(74) *Attorney, Agent, or Firm* — Woodcock Washburn LLP

(57) ABSTRACT

A process for rendering highlighter ink strokes and non-highlighter ink strokes in a non-rastering environment is described. Strokes may be grouped under a node having a predefined opacity. The strokes inherit the opacity from the node. Additionally, visuals containing highlighter strokes of the same color are grouped into collections of visuals (one collection per each highlighter color), and change the opacity of the collection (parent) visual to semi-transparent (or any other transparency value defined for the highlighter effect).

16 Claims, 9 Drawing Sheets

RENDERING HIGHLIGHTING STROKES

CROSS-REFERENCE TO RELATED APPLICATIONS

This application claims the benefit of U.S. Provisional Application No. 60/673,769, filed Apr. 22, 2005, the entirety of which is incorporated herein by reference.

BACKGROUND OF THE INVENTION

1. Field of the Invention

Aspects of the present invention relate to computing systems. More particularly, aspects of the present invention relate to rendering highlighting strokes.

2. Description of Related Art

Some computing platforms provide the ability to render ink strokes through combinational rendering processes. For instance, for two ink strokes of different colors, a system may combine the ink strokes to produce a third color. This process is sometimes referred to as subtractive rendering.

The rendering of highlighting colors is an example where the combinational approach to color rendering can work well. For instance, when a user is highlighting electronic ink, the expectation is that previously rendered highlighting strokes of a different color will change to reflect the combination of the first highlighting color and the second highlighting color.

Some rendering systems lack the ability to use a combinational approach to color handling. Instead, some systems may provide control of opacity or transparency.

A system and process are needed that allow the rendering of highlighting where only opacity or transparency is provided.

BRIEF SUMMARY OF THE INVENTION

Aspects of the present invention address one or more of the problems described above, thereby providing highlighting results.

BRIEF DESCRIPTION OF THE DRAWINGS

The present invention is illustrated by way of example and not limited in the accompanying figures.

DETAILED DESCRIPTION OF THE INVENTION

Aspects of the present invention relate to rendering highlighting ink strokes in systems that do not support rastering operations.

It is noted that various connections are set forth between elements in the following description. It is noted that these connections in general and, unless specified otherwise, may be direct or indirect and that this specification is not intended to be limiting in this respect.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All other characteristics can be used as well.

| Terms | |
|---|---|
| Term | Definition |
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |

-continued

| Term | Definition |
|---|---|
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Document | Any electronic file that has a viewable representation and content. A document may include a web page, a word processing document, a note page or pad, a spreadsheet, a visual presentation, a database record, image files, and combinations thereof. |
| Render or Rendered or Rendering | The process of determining how information (including text, graphics, and/or electronic ink) is to be displayed, whether on a screen, printed, or output in some other manner. |
| Computer-readable medium | Any available media that can be accessed by a user on a computer system. By way of example, and not limitation, "computer-readable media" may include computer storage media and communication media. |
| Computer storage media | "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. |
| Communication media | "Communication media" typically embodies computer-readable instructions, data structures, program modules or other data in a modulated data signal, such as a carrier wave or other transport mechanism, and includes any information delivery media. |
| Modulated data signal | The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media." |

General-Purpose Computing Environment

Figure 1:
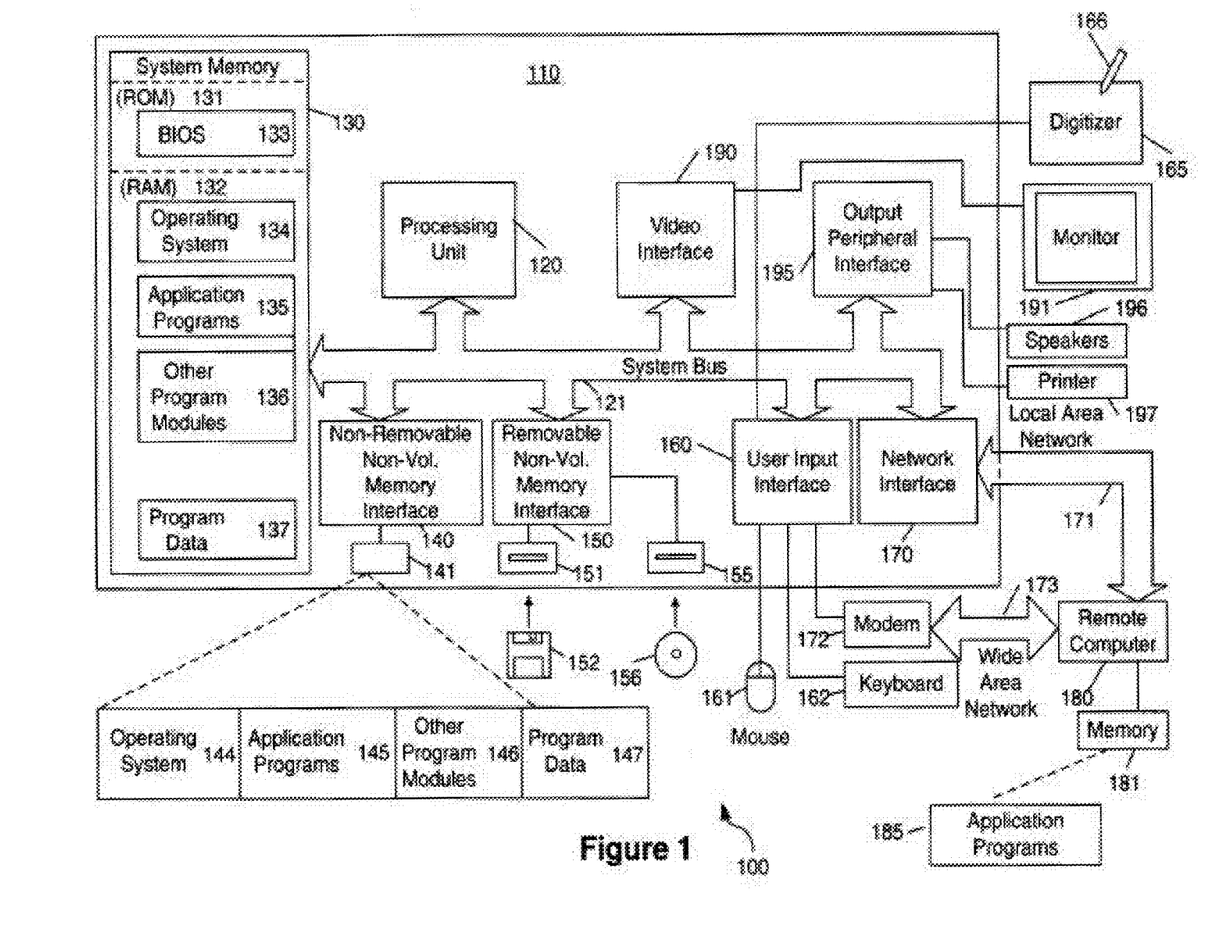
FIG. 1 illustrates a schematic diagram of a general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the illustrative operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media described above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are illustrative and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
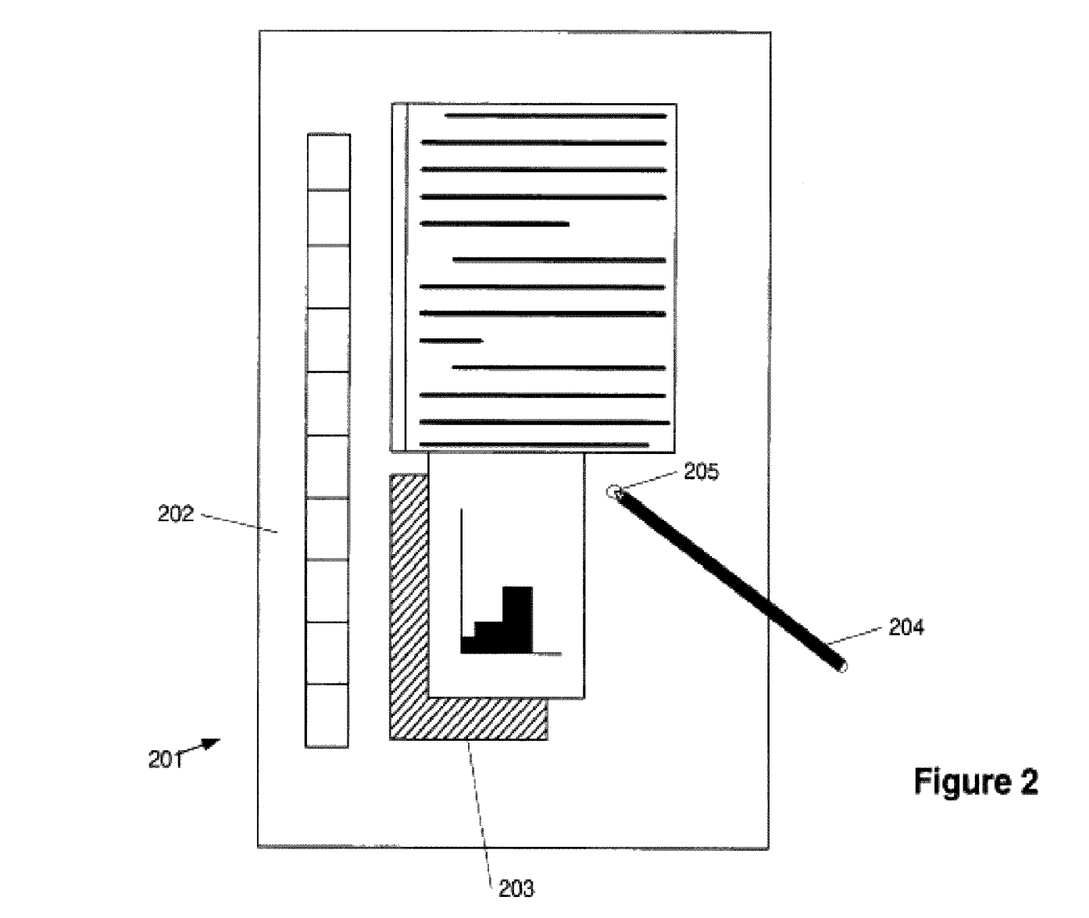
FIG. 2 shows an illustrative example of a tablet computer in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the Net programming model from Microsoft Corporation.

Rendering Highlighting Ink Strokes

Aspects of the present invention relate to presenting ink strokes as if they were drawn by a highlighter (highlighter strokes). Highlighter strokes may be considered as semi-transparent strokes that meet the following user expectations:
  a. Highlighter over background: the background is visible through the highlighter stroke, the color of the highlighter added to the background colors.
  b. Highlighter over regular ink: the ink strokes are visible through the highlighter stroke, the color of the highlighter added to the colors of ink strokes.
  c. Regular (opaque) ink over highlighter: highlighter strokes not visible through opaque ink strokes.
  d. Highlighter over highlighter of the same color (and opacity, which is assumed as a default): the color and opacity of the intersection area is no different from the color and opacity of the highlighter. Highlighter over another highlighter of a different color: the colors and the opacity of the highlighters are summed in the intersection area.

Figure 3:
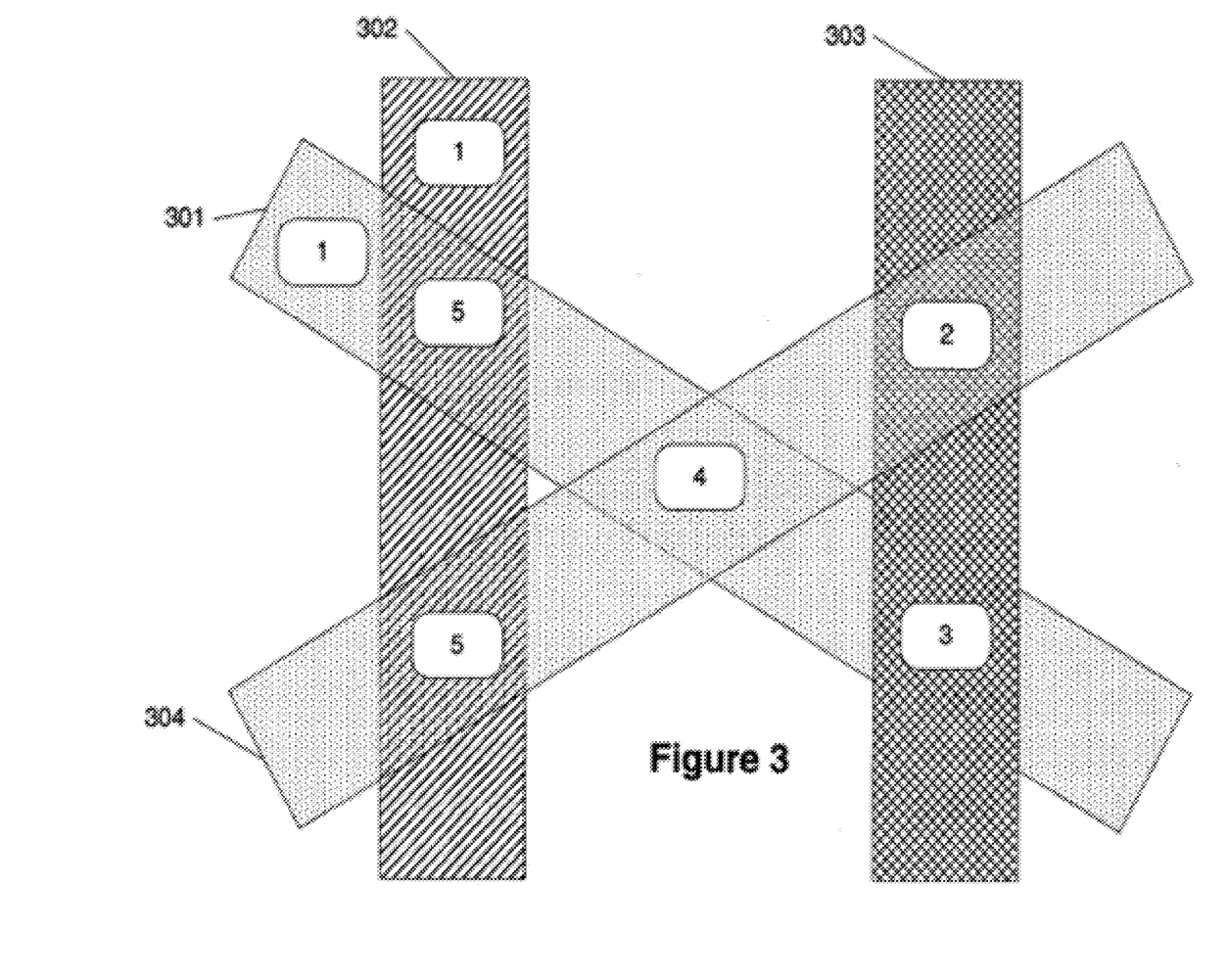
FIG. 3 shows an example of rendering highlighting ink strokes and non-highlighting ink strokes by adding and subtracting colors associated with the highlighting ink.

FIG. 3 shows a number of highlighting and non-highlighting ink strokes. FIG. 3 shows highlighter ink stroke 301 of a first color, highlighter ink stroke 302 of a second color, non-highlighter ink stroke 303, and highlighter ink stroke 304 of the first color. Here, the combination of ink strokes has been rendered using a graphics engine that supports combining colors (for instance, GDI). The desired highlighter effect was achieved by applying a specific raster operation mode to the graphics context before painting (filling) regions representing highlighter strokes.

FIG. 3 shows regions 1 in highlighter strokes 301 and 302 with no additional strokes. Region 2 is highlighter stroke 304 over opaque ink stroke 303. Region 3 is opaque ink stroke 303 over highlighter ink stroke 301. Region 4 is the intersection of highlighter ink strokes 301 and 304 of the same color. Regions 5 are the intersections of highlighter ink stroke 301 of the first color and highlighter ink stroke 302 of the second color and of highlighter ink stroke 304 of the first color and highlighter ink stroke 302.

The rendering of FIG. 3 is made possible by rasterizing operations in a graphics engine. In some situations, however, raster operations in a graphics engine are not available. Aspects of the present invention are directed to simulating the highlighter affect described above in the situations. In particular, the aspects of this invention suggest a method of simulating the highlighter effect on graphics systems where the raster operations are not available.

A non-rasterizing graphic system may represent everything using a tree of visual objects (referred to herein as "the Visual tree").

When rendered, the data in the Visual tree is composed to the effective visual presentation or "scene" a viewer sees. Visual objects (visuals) contain and manage other graphical objects, like geometries, brushes, animations, etc, that make up a drawn scene. Also, visuals can serve as containers for other visuals. This makes tree-based rendering multi-layered, with each visual representing a single layer in the composition.

Ink strokes may be rendered as collections of geometries, and, generally speaking, a collection of ink strokes can be rendered into a single visual as well as into an arbitrary number of visuals up to the total number of strokes.

All visuals can provide some common capabilities such as tree navigation (based on parent-child relation of visuals), child visual collection operations, opacity and others. Where raster operations are not included, creating a system that combines colors as described above may be difficult.

The following describes two design approaches. In both designs, a separate visual is created for each ink stroke, thereby providing better granularity in adjusting visual parameters per stroke. Alternatively, the ink strokes may be combined prior to rendering, thereby reducing the number of elements in the tree.

Solution 1: Change the opacity of visuals with highlighter strokes to semi-transparent (or any other transparency value defined for the highlighter effect).

Figure 4:
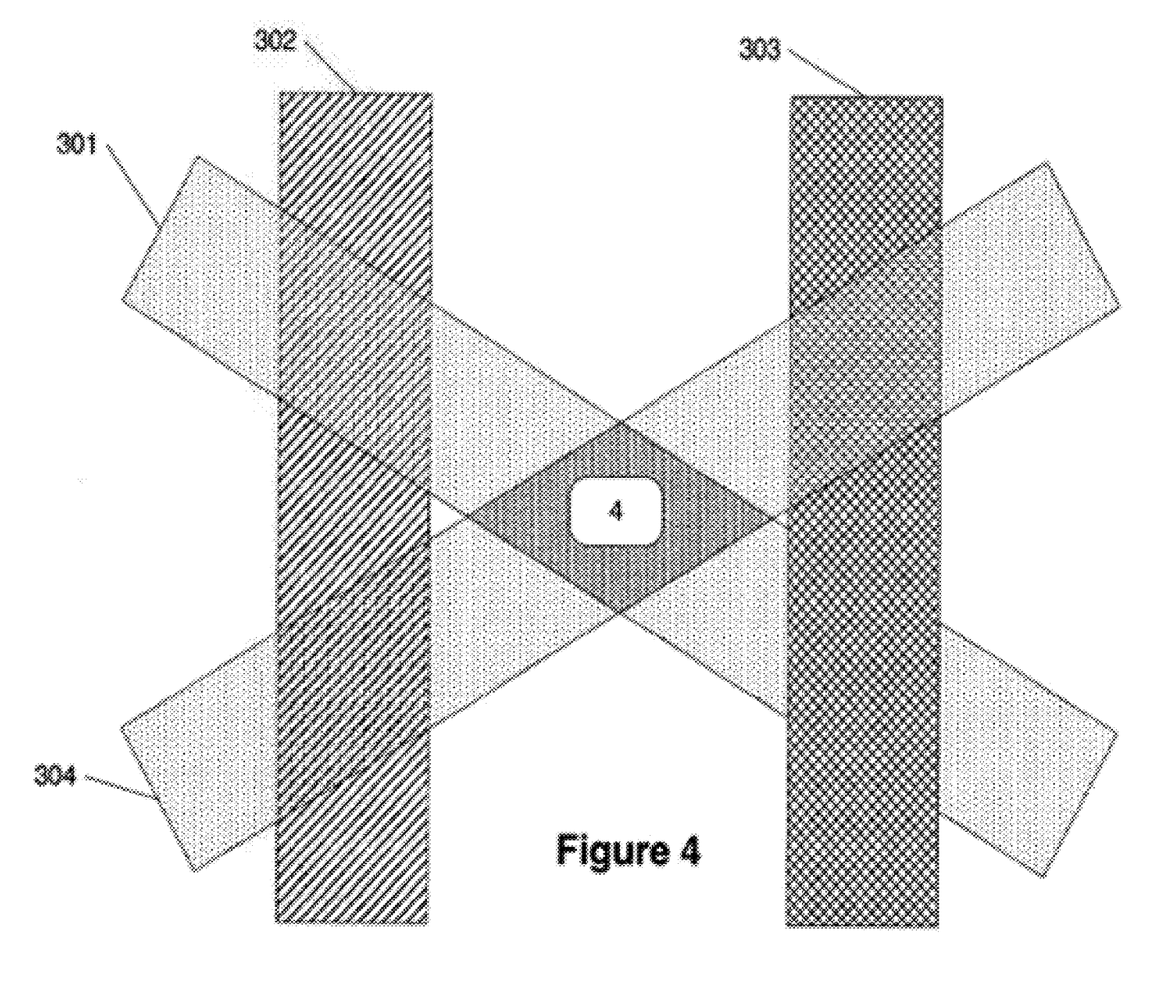
FIG. 4 shows a first example of highlighting ink strokes and non-highlighting in strokes in accordance with aspects of the present invention.

The result does not meet the expectation (4) "Highlighter stroke over another highlighter stroke of the same color", because Opacity has cumulative effect and when set per visual it makes intersections of two highlighter stroke of a color more opaque. The following sample image shows the difference. This is shown in FIG. 4 as the intersection (region 4) of highlighter ink strokes 301 and 304 being darker than the first color of the highlighter ink strokes Though this solution provides a very simple implementation, it changes the user experience between rastering and non-rastering systems for highlighting ink strokes. How highlighter strokes blend with each other at the intersections can be an important visual clue that they are indeed highlighters.

Solution 2: Group visuals containing highlighter strokes of the same color into collections of visuals (one collection per each highlighter color), and change the opacity of the collection (parent) visual to semi-transparent (or any other transparency value defined for the highlighter effect).

In this case, each stroke visual by itself is completely opaque so intersections of same-color strokes are no different from the bodies of the intersecting strokes—the expectation (4) is met. Grouping all same-color highlighter strokes under a single parent visual (ContainerVisual) allows one to change the opacity of the entire group as a whole. This does not affect the intersections of visuals within the group—they are still opaque—but it does affect the blending of the group with other strokes.

This approach works better with highlighter strokes drawn with a solid color brush and having no outline. As an alternative, a patterned or animated brush can be converted to a solid one to be used with a highlighter to provide a consolidated user experience.

For simplicity, one can also create a single ContainerVisual for all regular ink strokes. In general, the z-order position of the layer with regular ink relative to the layers with highlighter strokes is not important for the matter of the present invention. For visual consistency, one can position it on the top, over all highlighter strokes. The inter z-order of the ContainerVisuals with highlighter strokes does not matter either, as it has no effect on the color and opacity of highlighter stroke intersections.

Figure 5:
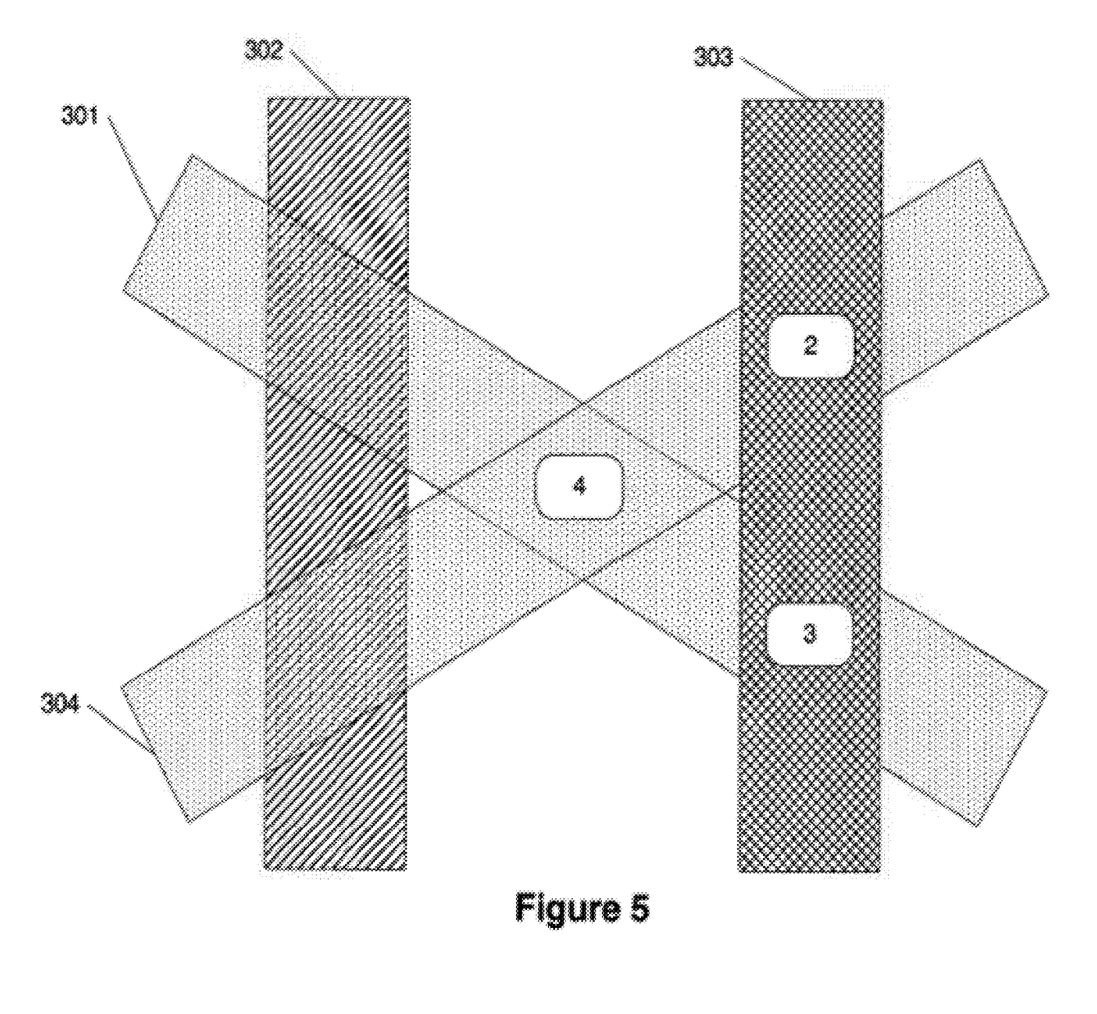
FIG. 5 shows a second example of highlighting ink strokes and non-highlighting ink strokes in accordance with aspects of the present invention.

FIG. 5 shows an example of this approach. Here, region 4 is of the same color as the color of the two highlighter ink strokes 301 and 304. Also, opaque ink 303 is the same between regions 2 and 3. Here, opaque ink 303 can be rendered in front of highlighter ink strokes 301 and 304 or behind them. Here, ink stroke 303 is rendered in front of highlighter ink strokes 301 and 304.

Figure 6:
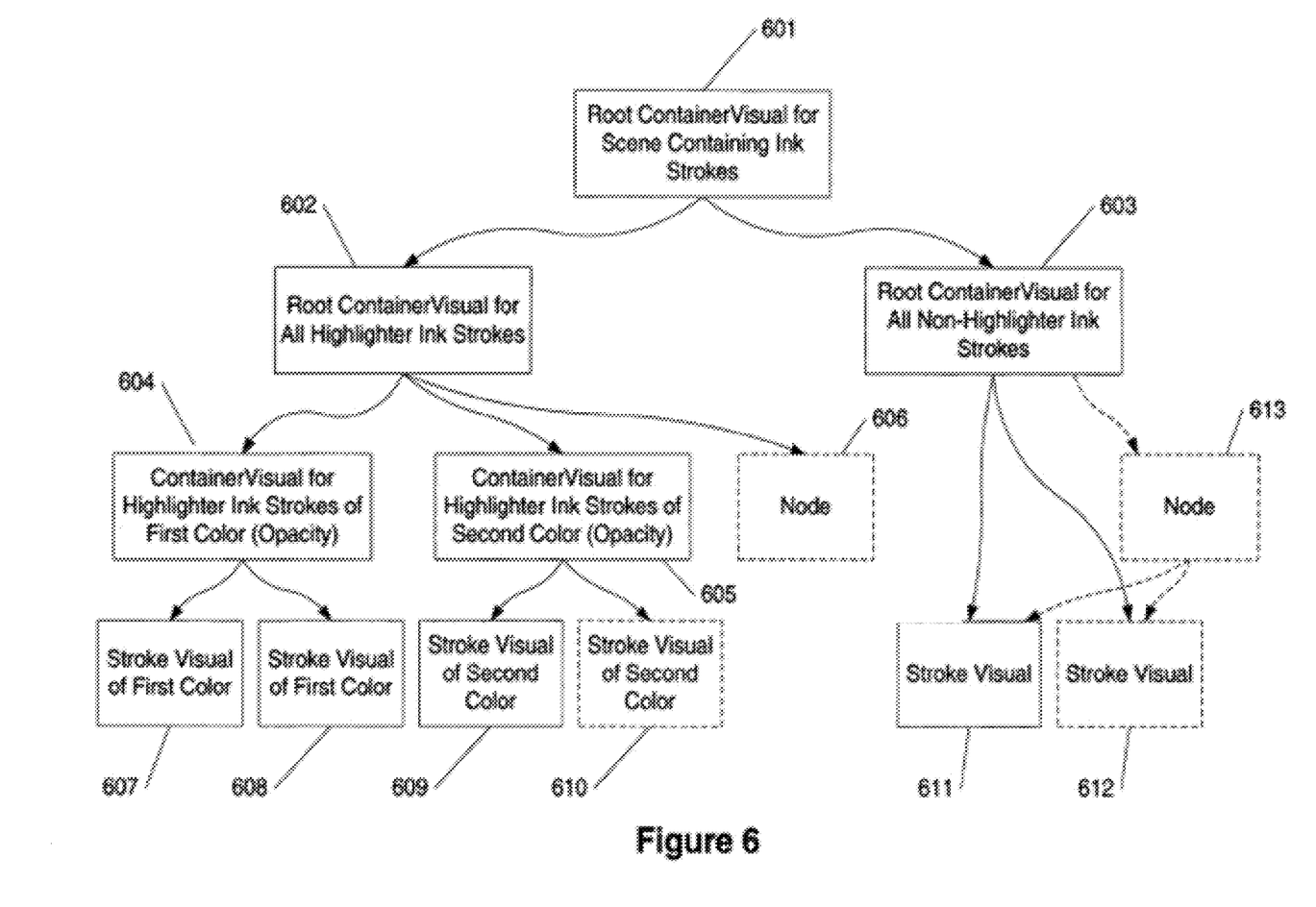
FIG. 6 shows a tree structure for housing stroke content in accordance with aspects of the present invention.

FIG. 6 shows a tree diagram of the various visual components. Root ContainerVisual 601 (the container that supports the objects to be rendered) supports the scene to be rendered with ink strokes. Root ContainerVisual for all highlighter ink stokes 602 is the node under which highlighter ink strokes may be located. Root ContainerVisual for non-highlighter ink strokes 603 is the node under which other strokes may be located.

The next set of nodes (604-606) are under parent node 602 and can be separated by color: a ContainerVisual for highlighter ink strokes of a first color 604, a ContainerVisual for highlighter ink strokes of a second color 605, and any additional highlighting color nodes 606. The opacity for each highlighter stroke color may be specified in nodes 604-606. Alternatively, the opacity may be specified elsewhere (including but not limited to being specified in nodes 607-610). Further, the opacity for nodes 604-606 may be stored, for instance, in ContainerVisual 602 and/or in ContainerVisual 601.

The stroke visual node 607 under node 604 is the first stroke of the first highlighter color. The stroke visual node 608 under node 604 is the second stroke of the first highlighter color. The stroke visual of the second color 609 under node 605 is the first stroke of the second highlighter color. Other nodes 606 under root container visual 602 may be included as well. In short, any number of strokes may be included as part of nodes, any number of nodes may be associated with containers (ContainerVisuals), and any number of root ContainerVisuals (602-603) may be included under the root ContainerVisual 601 for the scene.

Finally, the stroke visual nodes 611 and 612 relate to any other non-highlighter ink strokes under node 603.

Alternatively, node 613 may be created that pertains to non-highlighter ink strokes with strokes 611 and 612 being associated with node 613, which can then be associated with the non-highlighting ink stroke container 603.

Figure 7:
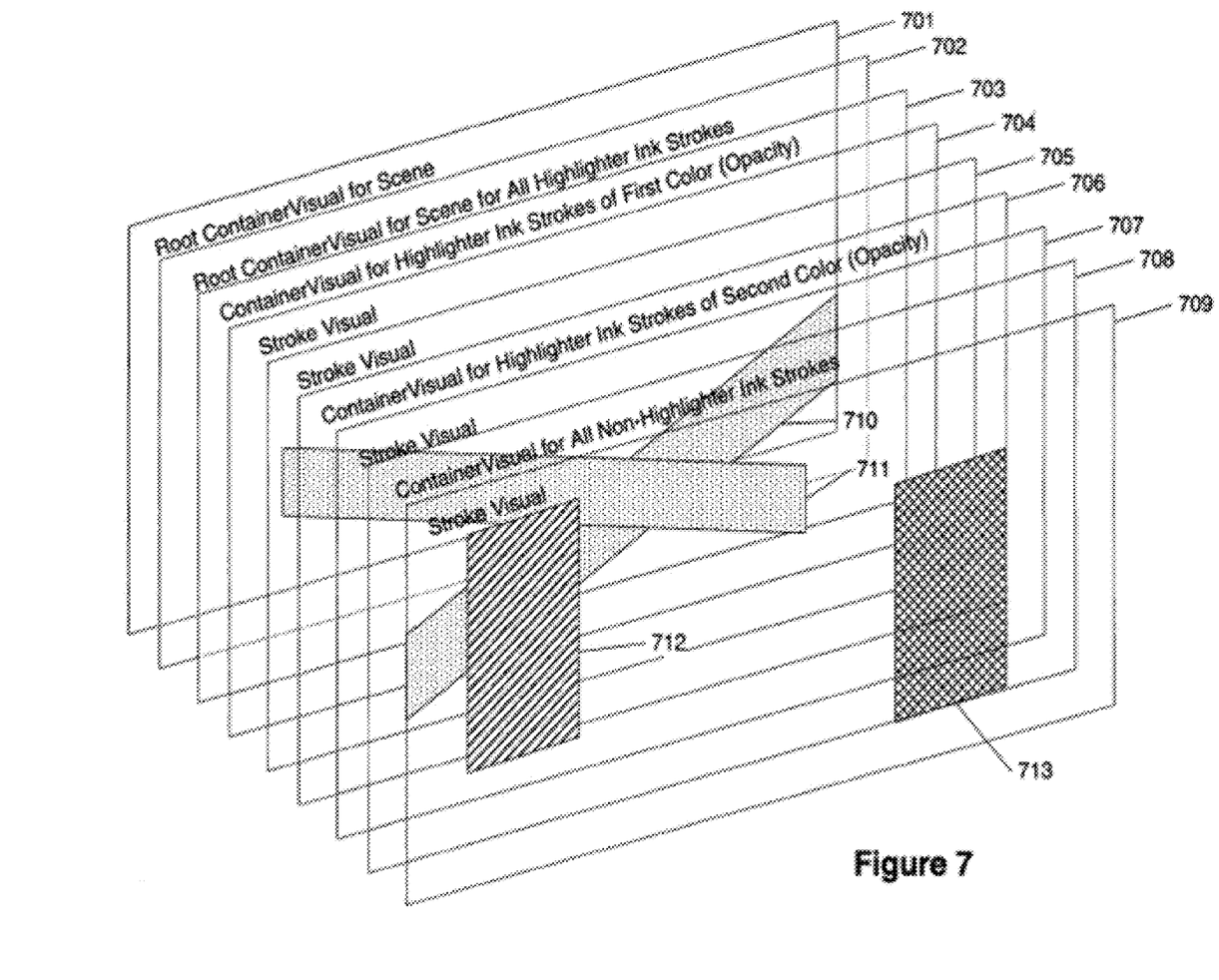
FIG. 7 shows a layered rendering of the tree structure of FIG. 6 in accordance with aspects of the present invention.

FIG. 7 shows the rendering in layers of the node described above. The root container for the visual scene is layer 701. The root container for the highlighter ink strokes 702 is next, followed by the container for the highlighter strokes of the first color 703. Next are the two stroke visuals 704-705 (from the above examples, 607-608). The container visual for the highlighter ink stroke of the second color 706 supports the stroke visual 707 (corresponding to stroke visual 609) for the ink stroke of the second highlighter color. Finally, the container visual 708 houses the non-highlighter strokes (here, stroke visual 709 corresponding to stroke visual 611).

FIG. 7 shows highlighter strokes 710 and 711 of the first color, highlighter stroke 712 of the second color and non-highlighter stroke 713.

Figure 8:
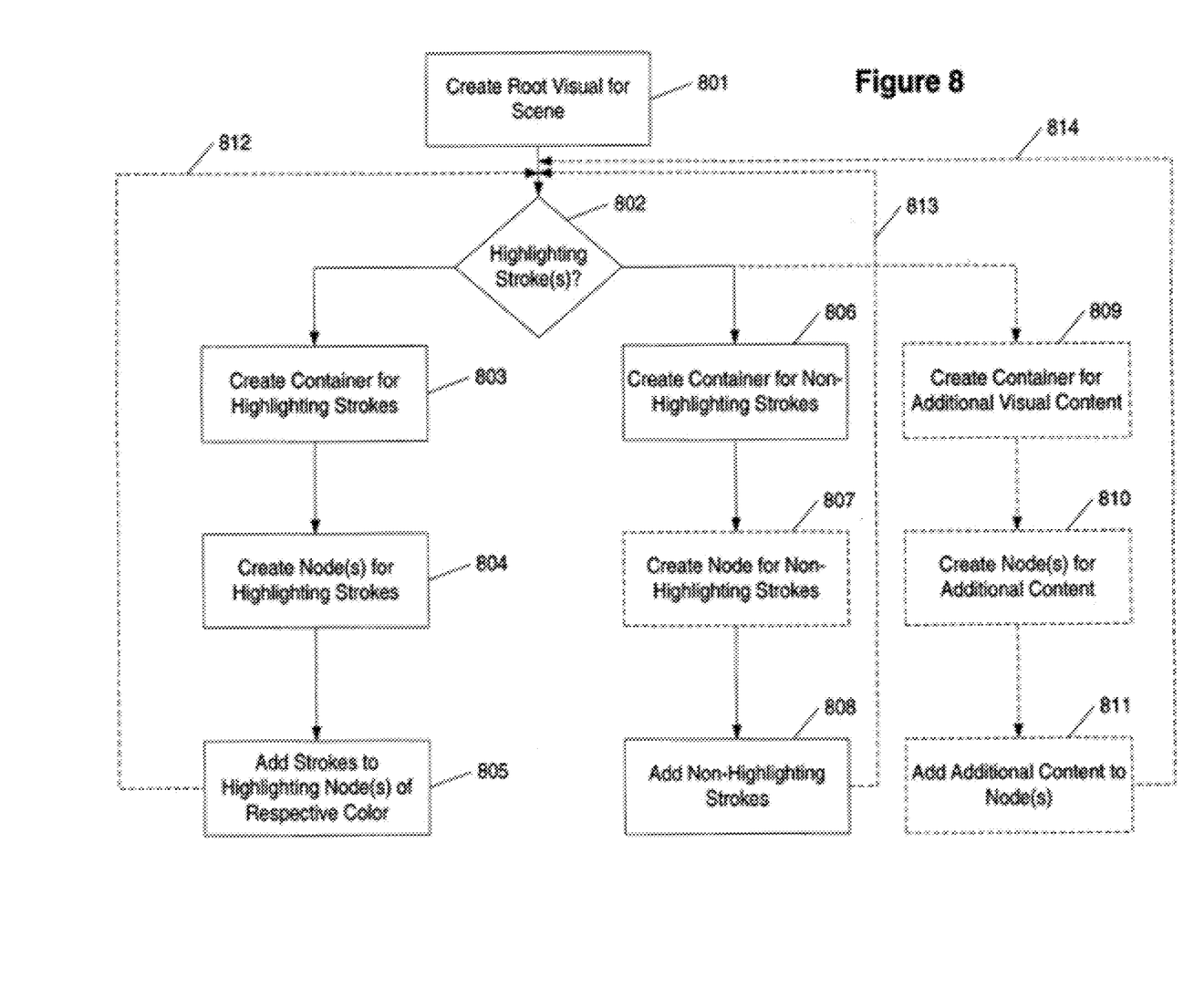
FIG. 8 shows an illustrative example of a method for creating a tree structure in accordance with aspects of the present invention.

FIG. 8 shows a method for creating a data structure relating to the tree that can be rendered. In step 801, a root visual for a scene is created. In step 802, it is determined whether a highlighting stroke or strokes are present. If highlighting strokes are present, then a container is created for the highlighting strokes in step 803. Nodes are created for all highlighting strokes 804 (for instance, one node for each color of highlighter). This may be done for each predefined highlighter available or just for those colors of highlighter present. Next, in step 805, strokes are added to the highlighting nodes for each respective color. The process may then end or return to step 802 as shown by broken line 812 for processing of additional visual content.

From step 802, if no highlighting strokes are present or the highlighting strokes have already been associated with nodes (in step 805), then in step 806 a container is created for non-highlighting strokes. Next, in step 808, non-highlighting ink strokes are added to the non-highlighting ink stroke container (created in step 806). Here, the process may end or return by broken line 813 to step 802.

Alternatively, as shown by broken box 807, nodes may be created and associated with the non-highlighting ink container. Next, the non-highlighting ink strokes maybe associated with the nodes from step 807.

Finally, additional method steps may optionally be included to associate any additional non-ink content with root 601. Here, a container 809 may be created to associate the non-ink content with the root 601. Next, one or more nodes 810 may be created for the additional content and associated with container 809. Next, additional content may be added to the nodes in step 811. The process may end at this point or may return to step 802 as shown by arrow 814 for additional processing.

Alternatively, it is appreciated that step 802 may be replaced by a linear processing of steps 803-805, steps 806-808, and steps 809-811 in any order. It is not important which group of visuals is processed and container (803, 806, and 809) created first.

Further, steps 803-805, steps 806-808, and steps 809-811 may be used in conjunction with step 802 but also be performed in any order (for instance, steps 809-811 performed first, followed by steps 806-808, and then followed by steps 803-805).

Yet further, the creation of the nodes and association with the strokes with the nodes may be independent of the order of the creation of the containers. For instance, some or all of the containers may be created. Next, some or all of the nodes may then be created. Finally, some or all of the strokes and other content may be associated with the nodes and/or containers.

Figure 9:
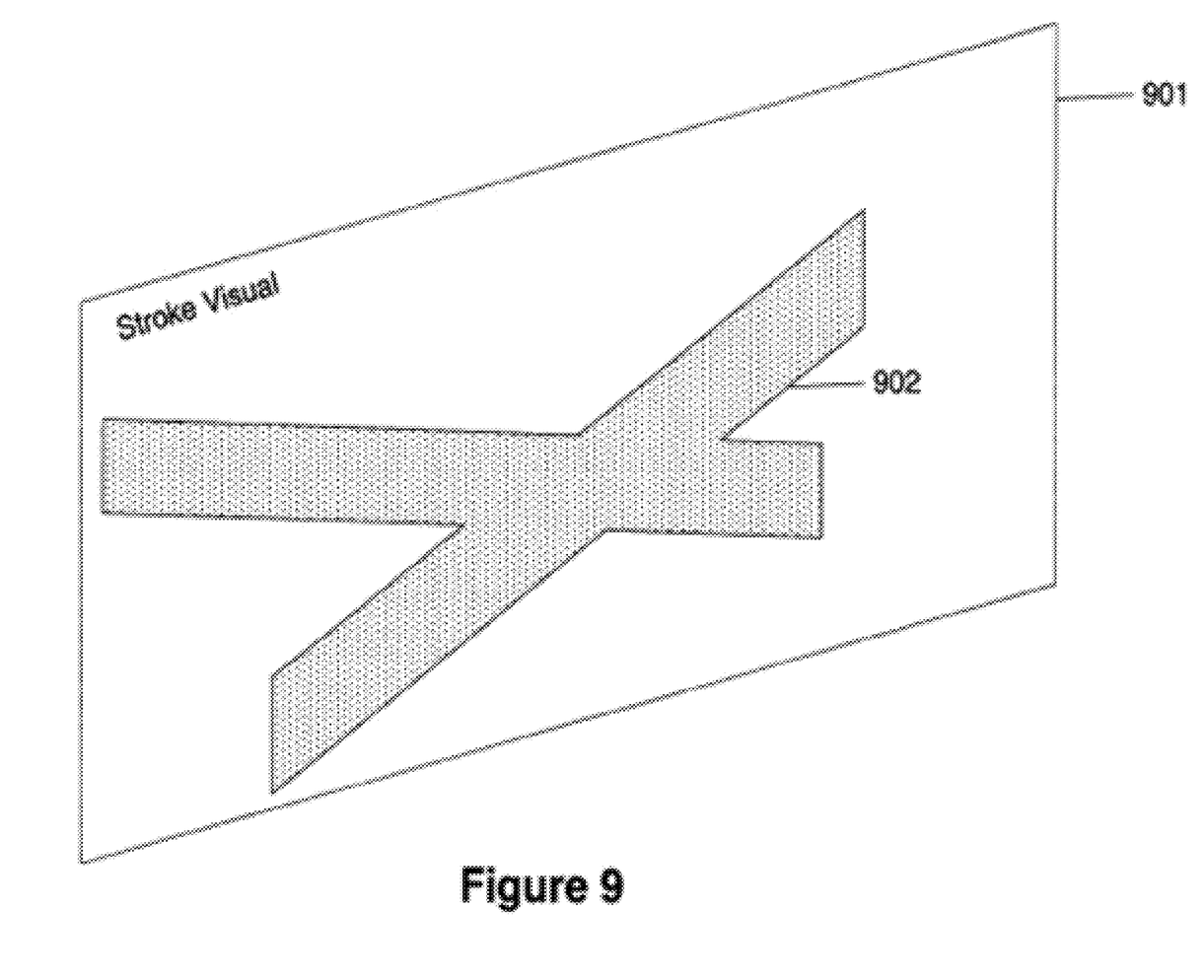
FIG. 9 shows an illustrative example of strokes combined into a single stroke node for a highlighting color in accordance with aspects of the present invention.

FIG. 9 shows an alternate example where all strokes of a given highlighter color are compressed into a single stroke visual. Here, node 901 contains stroke 902, which is a combination of strokes 710 and 711 from FIG. 7 above.

The following provides various programmatical approaches to handling and interfacing with highlighter ink. For instance, as described above, a rendering system may create a visual per each ink stroke. The root container visual is surfaced via the property RootVisual, so that user can attach the ink view to her application's visual tree. The user may access this information by using a command such as "public Visual RootVisual (get;)".

For highlighter ink, the Renderer may create a ContainerVisual for each solid color corresponding to the highlighter brush, may set the transparency to 50% transparency for that container (for instance), and may place it underneath the container of regular ink. When a highlighter container becomes empty, the Renderer removes it.

The following steps provide an example of a process for handing highlighter ink. First, a user creates a renderer for a collection of strokes:

a. StrokeCollection having the following strokes:
      1. Regular stroke
      2. Highlighter yellow stroke
      3. Regular blue stroke b. Renderer's RootVisual (from top to bottom)
   1. Regular blue stroke
   2. Regular red stroke
   3. ContainerVisual for Yellow Highligher stroke
      1. Highlighter yellow stroke
Next, the user adds a red highlighter stroke:
a. StrokeCollection:
   1. Regular red stroke
   2. Highlighter yellow stroke
   3. Regular blue stroke
   4. Highlighter red stroke
b. Renderer's RootVisual (from top to bottom):
   1. Regular Blue Stroke
   2. Regular Red Stroke
   3. ContainerVisual for Red Highlighter strokes
      1. Highlighter Red Stroke
   4. ContainerVisual for Yellow Highlighter strokes
      1. Highlighter Yellow Stroke An Ink View renderer (for instance, a static renderer) may provide a pair of methods for integrating dynamic rendering visual tree with the visual tree of the ink view. The methods may include "public bool AttachIncrementalRendering(Visual visual, DrawingAttributes da)" and "public bool DetachIncrementalRendering(Visual visual)."

The parameter "visual" is the root visual of the dynamic renderer.

The following lists possible drawing attributes for ink:
a. Color
b. IsHighlighter
c. StylusTip
d. StylusTipTransform
e. Height
f. Width
g. IgnorePressure
h. FitToCurve The following provides an illustrative public class for a Stroke:

```
public class Stroke
{
    //Stroke would raise this event for PointChanged,
DrawingAttributeChanged, DrawingAttributeReplaced,
    //Renderer would simply listen to this
    public event EventArgs Invalidated;
    protected virtual void OnInvalidated(EventArgs e)
    {
        //developers who subclass Stroke and need a repaint could raise
Invalidated through this protected virtual
    }
    //these next two methods are no longer virtuals, they are just public
methods that call a protected virtual developers can override
    //these methods disambiguate the opacity required for the dc because
our Renderer or StrokeCollection.Draw
    //would never call these methods
    public void Draw(DrawingContext dc)
    {
        //call public Draw method with the strokes.DA
        this.Draw(dc, this.DrawingAttributes);
    }
    public void Draw(DrawingContext dc, DrawingAttributes da)
    {
        //the code may not call this public API so one can assume that
opacity
        //has not been set up
        // When creating a solid brush with a color, the color.A is taken
into account. So we don't need to PushOpacity.
        if (da.IsHighlighter)
        {
            DrawingAttributes datouse = da;
            if(da.Color.A != solidStrokeAlpha)
            {
                // One may make a copy of da since it may refer to the DA
on the current Stroke.
                datouse = da.Copy( );
                Color color = datouse.Color;
                color.A = solidStrokeAlpha; //255
                datouse.Color = color;
            }
            pushOpacity( );
            this.DrawCore(dc, datouse);
            popOpacity( );
        }
        else
        {
            this.DrawCore(dc, da);
        }
    }
    // StrokeVisual.Draw and StrokeCollection.Draw - calls this
    //so one can assume the correct opacity has already been pushed on dc
    internal void DrawInternal(DrawingContext dc, DrawingAttributes
DrawingAttributes)
    {
        this.DrawCore(dc, da);
    }
    //
    1) One implementation so developers can see what is done here -
including how handle IsHollow
    2) the fact that opacity has already been set up correctly for the call
    3) that developers should not call base.DrawCore if they override this
    protected virtual void DrawCore(DrawingContext dc,
DrawingAttributes da)
    {
        //One default may include:
        PathGeometry strokeGeometry = null;
        if (da == this.DrawingAttributes)
        {
            strokeGeometry = _cachedPathGeometry
        }
        else
        {
            //compute one
            strokeGeometry = GetPathGeometry(da);
        }
        //if rendering with default drawing attributes
        dc.DrawGeometry(strokeGeometry, new SolidColorBrush(da.Color));
    }
    internal bool IsSelected
    {
        get {return _isSelected;}
        set
        {
            if (value != _isSelected)
            {
                _isSelected = value;
                OnInvalidated(new eventArg);     // This will tell Renderer
                                                 to repaint and the
            }
        }
    }
    //protected method for getting the PathGeometry of the Stroke - this
may not return the _cachedPathGeometry since it
    //is internal state, but rather a copy of it if the da's are the same
    protected PathGeometry GetPathGeometry(DrawingAttributes da);
    private PathGeometry _cachedPathGeometry;
}
```

Ink canvas may include the following:

```
internal void UpdateDynamicSelection(  StrokeCollection
strokesToDynamicallySelect,
                                       StrokeCollection
strokesToDynamicallyUnselect)
{
    if (strokesToDynamicallySelect != null)
    {
        foreach (Stroke s in strokesToDynamicallySelect)
        {
```

-continued

```
            _dynamicallySelectedStrokes.Add(s);
            s.IsSelected = true; }
        }
        if (strokesToDynamicallyUnselect != null)
        {
            foreach (Stroke s in strokesToDynamicallyUnselect)
            {
                _dynamicallySelectedStrokes.Remove(s);
                s.IsSelected = false;
            }
        }
    }
    internal StrokeCollection EndDynamicSelection(Visual visual)
    {
        foreach ( Stroke s in _dynamicallySelectedStrokes )
        {
            s.IsSelected = false;
        }
        return _dynamicallySelectedStrokes;
    }
```

The Renderer code may be modified as illustrated below:

```
internal class Renderer
{
    protected override void OnRender(DrawingContext drawingContext)
    {
        if (_highContrast == true &&
_stroke.DrawingAttributes.IsHighlighter)
        {
            // Do not render highlighters in high contrast
            return;
        }
        if (_highContrast == true)
        {
            DrawingAttributes copy = _stroke.DrawingAttributes.Copy( );
            copy.Color = Colors.Black);
            _stroke.DrawInternal(drawingContext,copy);
        }
        else
        {
            if (_stroke.DrawingAttributes.IsHighlighter == true &&
_stroke.DrawingAttributes.Color.A != solidStrokeAlpha)
            {
                Color color == _stroke.DrawingAttributes.Color;
                color.A = solidStrokeAlpha; // set it to be opaque;
                DrawingAttributes copy =
_stroke.DrawingAttributes.Copy( );
                Copy.Color = color;
                _stroke.DrawInternal(drawingContext, copy);
            }
            else
            {
                _stroke.DrawInternal (drawingContext,
_stroke.DrawingAttributes);
            }
        }
        // Do second pass drawing for the selected stroke.
        if (_stroke.IsSelected)
        {
            // Calculate the hollowedda
            hollowedda.Color = Color.White;
            _stroke.DrawInternal(drawingContext, hollowedda);
        }
    }
    private void StartListeningOnStrokeEvents(Stroke stroke)
    {
        stroke.Invalidated += new
EventHandler(OnStrokeInvalidated);
    }
    private void StopListeningOnStrokeEvents(Stroke stroke)
    {
        stroke.Invalidated -= new
EventHandler(OnStrokeInvalidated);
    }
    private void OnStrokeInvalidated(object sender, EventArgs
eventArgs)
    {
        Stroke stroke = (Stroke)sender;
        _visuals.TryGetValue(stroke, out visual);
        // The original value of IsHighligher and Color are cached in
StrokeVisual.
        // if (IsHighlighter value changed or (IsHighlighter == true
and not changed and color changed) detach and re-attach the
corresponding visual;
        // else (Invalidate the corresponding StrokeVisual)
    }
}
```

As described above, the RootVisual may contain three other ContainerVisuals. The highlighters go to the bottom, then regular ink, and regular ink's incremental rendering in on top. By default, Renderer creates a visual per each ink stroke.

Where this StrokeVisual is attached in the visual tree is dependent on whether this stroke is a regular ink or a highlighter ink:

For a regular stroke attached via the AttachIncrementalRendering operation (or in other words, if the stroke is for a dynamic rendering scenario), the Stroke Visual may be attached to the IncrementalRenderingVisual ContainerVisual.

For static rendering of a regular stroke, the StrokeVisual may be attached to the RegularInkVisual.

For a "highlighter" stroke (no matter it is for static rendering or for dynamic rendering), the Renderer creates a ContainerVisual for each solid color corresponding to the highlighter brush, sets 50% transparency to that container, and places it underneath of HighlitersRootVisual. When a highlighter ContainerVisual becomes empty, Renderer may remove it.

The following is an example where a users creates an InkPresenter for a collection of strokes. The result may be as follows:
   a. StrokeCollection:
     1. Regular Red Stroke
     2. Highlighter Yellow Stroke #1
     3. Regular Blue Stroke
     4. Highlighter Yellow Stroke #2
     5. Highlighter Red Stroke #1
     6. Highlighter Red Stroke #2
   b. Renderer's RootVisual (from top to bottom):
     1. IncrementalRenderingvisual
     2. RegularInkVisual
       1. Regular StrokeVisual 1 for the Blue Stroke
       2. Regular StrokeVisual 2 for the Blue Stroke
     3. HilightersRootVisual
       1. ContainerVisual for Yellow Highlighter strokes
         a. YellowStrokeVisual1
         b. YellowStrokeVisual2
       2. ContainerVisual for Red Highlighter strokes
         a. RedStrokeVisual1
         b. RedStrokeVisual2

In the event when the DrawingAttributes of a stroke changes, the following may occur. The Renderer starts to listen to DrawingAttributesChanged event as soon as a new StrokeCollection is set or a new stroke is added to an existing StrokeCollection. The DrawingAttributes fires an event when its value changes, and the event propagate to its owner (the stroke) and then to the Renderer. For the following two cases:
   a. If the changed attribute is the "IsHighlighter"
   b. Or if the change attribute is "color" and the stroke is a highlighter.

The corresponding visual of the stroke will be detached. After that, the visual is re-attached to the visual tree. This is because a highlighter stroke is treated differently than a non-highlighter one when attaching to a visual tree.

Otherwise, just invalidate the visual and the system will re-render so that the changed DrawingAttributes will take effect.

The present invention has been described in terms of preferred and illustrative embodiments thereof. Numerous other embodiments, modifications and variations within the scope and spirit of the appended claims will occur to persons of ordinary skill in the art from a review of this disclosure.

We claim:

1. A computer-readable storage medium having computer-executable instructions stored thereon, the storage medium comprising instructions for:
   determining a transparency value for rendering highlighting ink;
   determining that a highlighting ink stroke is present and, in response to the determination, creating a data structure comprising a first portion providing a root container forming a root of a visual tree for representing visual objects to be rendered in a non-rasterizing environment, said first portion having a second portion and a third portion,
   said second portion including a highlighting ink container having at least a first node and a second node, wherein same-color highlighter strokes are grouped into a same node and each of the highlighter strokes are set to full opacity,
   said first node including a highlighting ink node of a first highlighting ink color, said first node including at least one highlighting ink stroke of said first highlighting ink stroke color, and
   said second node including a highlighting ink node of a second highlighting ink color, said second node including at least one highlighting ink stroke of said second highlighting ink stroke color; and
   said third portion including a non-highlighting ink container, said third portion including at least one non-highlighting ink stroke; and
   storing said transparency value in said second portion.

2. The computer-readable storage medium according to claim 1, said third portion further including a third node associated with said non-highlighting ink container and to which said at least one non-highlighting ink stroke is associated.

3. A computer-implemented method for rendering highlighting ink comprising:
   determining, by a processor, a transparency value for rendering the highlighting ink;
   determining, by the processor, that a highlighting ink stroke is present and, in response to the determination, creating a first container for the highlighting ink stroke in a data structure for representing visual objects to be rendered, and otherwise creating a second container for non-highlighting strokes and adding the non-highlighting strokes to the second container;
   creating a root node for storing visual content and associating said first container with said root node;
   grouping, by the processor, highlighter strokes by color and storing same-color highlighter strokes into a same node added to said first container, wherein each of the highlighter colors are set to full opacity;
   storing said transparency value in the first container;
   wherein each of said visual objects represents a layer to be rendered in a composition; and
   rendering said composition using said transparency value for rendering the highlighter strokes.

4. The computer-implemented method according to claim 3, wherein said rendering step is a non-rastering step.

5. The computer-implemented method according to claim 3, said grouping step including grouping said at least some strokes in a visual tree.

6. The computer-implemented method according to claim 5, said grouping step grouping highlighter strokes under a highlighter node and grouping non-highlighter strokes under a non-highlighter stroke node.

7. The computer-implemented method according to claim 3, said grouping step further comprising creating a root node for housing all visual content.

8. The computer-implemented method according to claim 7, said grouping step further comprising creating a first container for housing all highlighter ink strokes and associating said container with said root node.

9. The computer-implemented method according to claim 8, said grouping step further comprising creating a second container for housing all highlighter ink strokes of a first color and associating said second container with said first container and associating all highlighter ink strokes of said first color with said second container.

10. The computer-implemented method according to claim 9, said grouping step further comprising creating a third container for housing all highlighter ink strokes of a second color and associating said third container with said first container and associating all highlighter ink strokes of said second color with said third container.

11. The computer-implemented method according to claim 7, said grouping step further comprising creating a first container for housing all non-highlighter ink strokes; associating said container with said root node; and associating all non-highlighter ink strokes with said first container.

12. The computer-implemented method according to claim 7, said grouping step further comprising creating a first container for housing all non-highlighter ink strokes;
   associating said container with said root node;
   creating a node for at least some of said non-highlighter ink strokes;
   associating said node with said first container; and
   associating said at least some non-highlighter ink strokes with said node.

13. A computer system configured to support rendering of highlighting ink strokes in a non-rasterizing graphical environment comprising:
   a processor that receives highlighter ink strokes and non-highlighter ink strokes; and
   a memory having stored therein computer-executable instructions that, when executed by the processor, cause the system to:
   determine a transparency value for rendering the highlighting ink; and
   determine that a highlighting ink stroke is present and, in response to the determination, create a data structure for representing visual objects to be rendered, said data structure having a root container, a first container for highlighting ink stroke content, a second container for non-highlighting ink stroke content, and at least first and second nodes associated with a highlighting ink stroke and a non-highlighting ink stroke, respectively, wherein same-color highlighter strokes are grouped into a same node and each highlighter color is set to full opacity, and wherein each of the at least first and second nodes stores the transparency value for rendering the highlighter strokes.

14. The computer system according to claim 13, said system further comprising a renderer that renders said data structure from said storage.

15. The computer system according to claim 14, further comprising a non-ink stroke container as part of said data structure, said non-ink stroke container being associated with content other than said highlighting ink strokes and said non-highlighting ink strokes.

16. The computer system according to claim 14, said data structure comprising a visual tree.

* * * * *